J. KEEFE.
CASING FOR ELECTRICAL APPARATUS AND REMOVABLE LOCKING AND INSULATING MEANS.
APPLICATION FILED APR. 24, 1912.
1,169,263.
Patented Jan. 25, 1916.
2 SHEETS—SHEET 1.
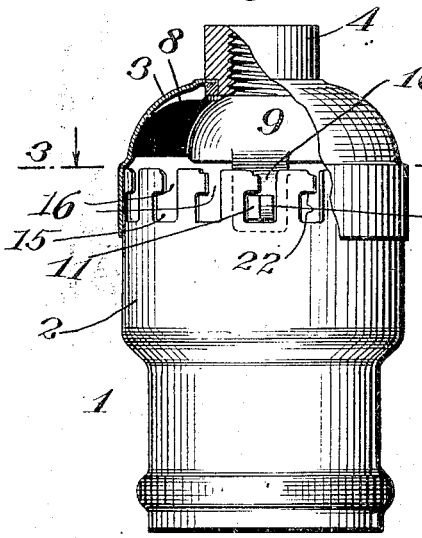
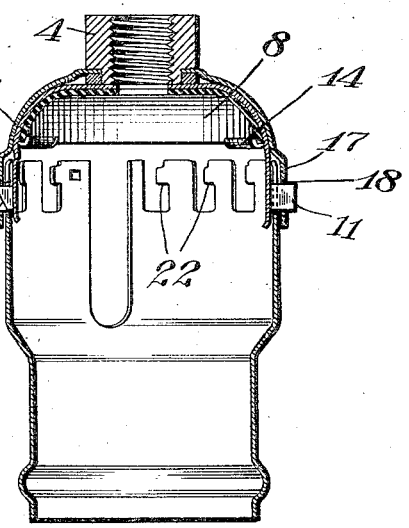
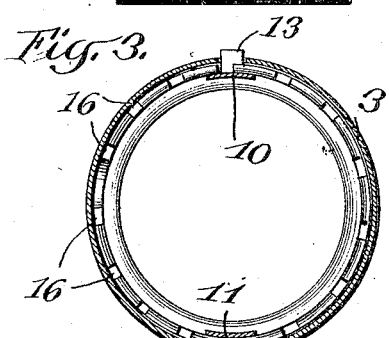
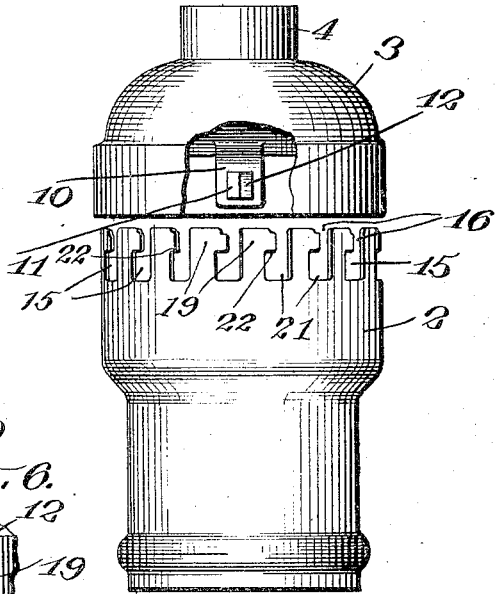
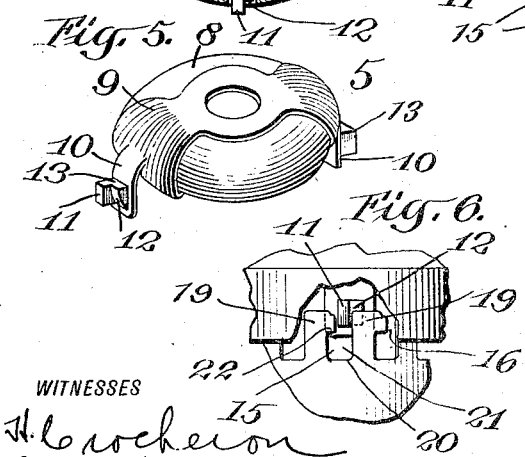
WITNESSES
INVENTOR
Joseph Keefe
BY
ATTORNEY

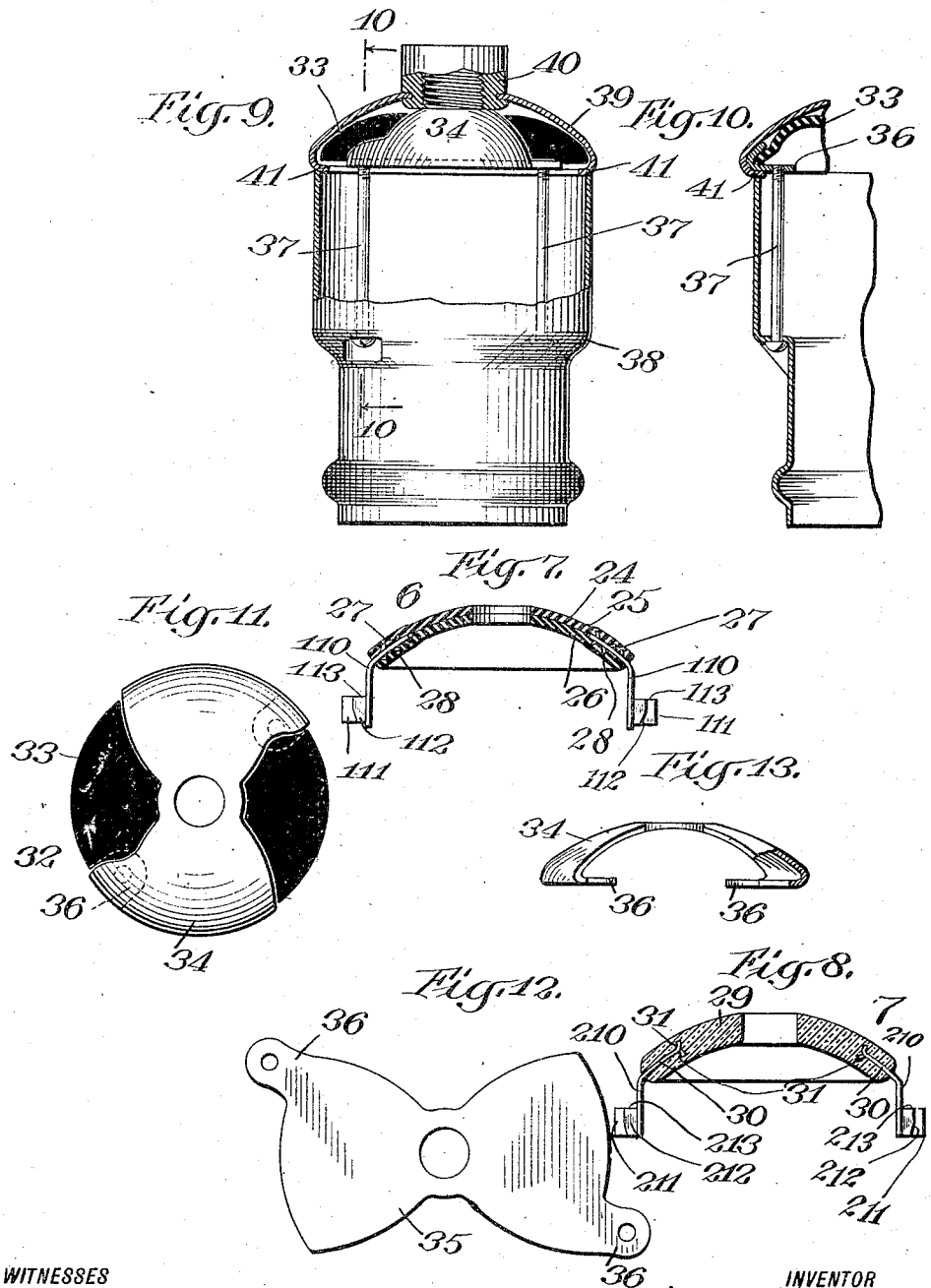

UNITED STATES PATENT OFFICE.

JOSEPH KEEFE, OF BOSTON, MASSACHUSETTS, ASSIGNOR TO THE ZEE SOCKET & MFG. COMPANY, OF BOSTON, MASSACHUSETTS, A CORPORATION OF MASSACHUSETTS.

CASING FOR ELECTRICAL APPARATUS AND REMOVABLE LOCKING AND INSULATING MEANS.

1,169,263.   Specification of Letters Patent.   Patented Jan. 25, 1916.

Application filed April 24, 1912. Serial No. 692,814.

*To all whom it may concern:*

Be it known that I, JOSEPH KEEFE, a citizen of the United States, and a resident of Boston, in the county of Suffolk and State of Massachusetts, have invented certain new and useful Improvements in Casings for Electrical Apparatus and Removable Locking and Insulating Means, of which the following is a specification taken in connection with the accompanying drawings, which form a part of the same.

My invention relates to electrical apparatus and more particularly to casings for such apparatus and to removable locking means for connecting the sections of the casing together; also to a removable insulating lining for one member of the casing. For purposes of illustration I have shown the casing in the drawings as a casing for an electric socket, though it is to be understood that my invention is not to be confined to casings for such sockets.

In the claims wherein I refer to "socket casings", I mean by this term a casing for any form of electrical apparatus and do not mean to limit the claims to casings for electric sockets, which I have shown by way of illustration, and with which my invention is particularly adapted to be used.

My invention further relates to certain articles of manufacture and details of construction which will be more fully hereinafter described in the specification and pointed out in the claims.

In the accompanying drawings showing illustrative embodiments of my invention and in which the same reference numerals refer to similar parts in the several figures, Figure 1 is a side elevation, partly broken away, of a casing for an electric light socket equipped with my invention; Fig. 2 is a longitudinal vertical section through the socket casing shown in Fig. 1; Fig. 3 is a horizontal section taken substantially on the line 3—3 of Fig. 1; Fig. 4 is a side elevation partly broken away of the different sections of the casing as they are about to be brought into engagement; Fig. 5 is a perspective view of one form of locking member and insulation for the cap; Fig. 6 is a fragmentary side elevation, broken away, showing the inclined member on the locking device coöperating with a portion of the shell; Fig. 7 is a sectional view of a modified form of locking member; Fig. 8 is a sectional view of another modified form of locking member. Fig. 9 is a side elevation, partly in section, of a further modification; Fig. 10 is a vertical section substantially on the line 10—10 of Fig. 9; Fig. 11 is a plan view of the locking and insulating member; Fig. 12 is a plan view of the blank from which the yoke of the removable lining is preferably formed; Fig. 13 is a side elevation partly in section, of the yoke.

One portion of my invention includes a readily removable locking means removably mounted in the casing which is adapted to lock the sections of the casing together and which can itself be almost instantly removed from the casing to permit the casing to be replated or refinished as may be desired, when it can be immediately repositioned within the casing.

It has also been old prior to my invention to use insulating linings for the cap of such casings which were cut away to form notches or otherwise provided with surfaces to coöperate with the locking mechanism or member permanently secured to the cap, the insulating lining being bent or sprung into position so as to be held within the cap, and preferably by coöperating with the permanent locking member. In replating or refinishing the casing to match or harmonize with any particular electric fixture, the manufacturers of such fixtures have had to pry off or remove this interior lining of the cap. This frequently marred the insulating lining of the cap. The frequency and extent of the damage to the lining would depend upon the labor employed for this purpose. Usually unskilled labor is employed with the result that large numbers of the insulating linings of the cap have been either ruined by being removed or have been so torn or marred that when they were again placed in the cap, after it has been replated or refinished, it was liable not to retain its position and the tears or cracks in the lining caused by its removal and repositioning would often defeat the very purpose of providing the cap with an insulation to prevent it from becoming electrified with possible damage to the fixture or shock to the person who may be handling it after the fixture has been installed.

Another portion of my invention is to provide the cap with a removable insulating lining which can be instantly removed from the cap to permit the cap and shell to be replated and refinished and again mounted in the cap without damage to the insulating lining, and further to provide such a removable insulating lining for the cap with locking means to lock the cap and shell together.

In the illustrative embodiments of my invention shown in the drawings, 1 is the socket casing including the shell 2 and cap 3 which is provided with the ordinary nipple 4. Removably mounted within the cap 3 is my locking member 5, Fig. 5, or the locking members 6 and 7 shown in Figs. 7 and 8, respectively. This locking member, in the preferred construction, is an insulating member 8 provided with a yoke 9 having ears 10, 10 each ear being provided with a reduced portion 11 and an inclined portion 12, the two portions 11 and 12 forming a head 13. The insulating member 8 and the yoke 9 are secured together in any suitable manner such as by first positioning the insulating lining or member 8 within the yoke 9 and then turning up the flanges 14, 14, Fig. 2, of the yoke so as to permanently secure the insulating member or lining 8 to the yoke which, however, is removably mounted within the cap 3.

The shell 2 is provided with coöperating surfaces to coöperate with the particular form of locking surfaces which may be mounted upon the locking member 5. One such form of locking surfaces, and the one which I preferably use, are bayonet slots 15 having the reduced portion or throats 16. Any suitable number of bayonet slots may be used. Preferably I employ a plurality of them as shown in the drawings. It is also to be understood that the locking member 5 may be provided with one or more locking surfaces to coöperate with the particular form of locking surfaces carried by the shell 2. I preferably provide two such locking surfaces on the different ears 10, 10.

To operate my locking member I removably mount it within the cap 3 and provide the cap at some suitable point, preferably in the skirt 17, with openings 18, 18, to receive the locking surfaces carried by the locking member 5. The resiliency of the locking member 5 will cause the locking surfaces to remain seated in the openings 18, 18.

To lock the cap and shell together the two are brought into substantially the position shown in Figs. 4 and 6. The reduced portion 11 is made to register with the throat 16 of the bayonet slot, which when the inclined surface 12 is employed will cause it to engage with one of the teeth 19 formed by the different bayonet slots, Fig. 6. By further pressing the cap and shell together this inclined surface 12 upon the ear 10 will cause the entire ear to move in toward the center of the socket until the reduced portion 11 of the head has substantially reached the bottom 20 of the slot 15. By then giving the cap and shell a slight relative rotation with relation to each other, as for example moving the cap 3 slightly to the left of the position shown in Fig. 6, the inclined surface 12 will free itself from the tooth 19 and will then instantly snap into the enlarged portion 21 of the bayonet slot, the head 13 being preferably so formed that it will snugly fit the enlarged portion 21 of the bayonet slot and prevent any relative rotation between the cap and shell after they have once been assembled. The lip 22 coöperating with the upper surface of the head 13 will, of course, prevent the socket and shell from being disconnected by a longitudinal strain or pull. The parts will then be firmly and non-rotatably connected together by the removable locking member 5 coöperating with the coöperating surfaces of the cap and shell.

To disengage the cap and shell, whenever this may be desirable, it is merely necessary to press in the heads 13 of the locking member 5 to a sufficient extent to get the inclined surface 12 so that it will engage with the tooth 19 upon a slight relative rotation of the cap and shell and then give the cap and shell a slight relative rotation, sufficient to bring the reduced portion 11 into register with the throat 16. A longitudinal pull upon the cap and shell will then immediately disengage them. While this will permit the cap and shell to be disengaged, the locking means or insulating lining will still be removably held in the cap until such time as it may be desirable to remove it for any purpose as for example to refinish the casing or cap, when further inward pressure upon the head 13 will cause the heads to become disengaged from the opening 18 in the skirt of the cap.

Instead of using such a locking member as shown in Fig. 5, I may use any other suitable locking member of which various modifications may be made all coming within the terms of my invention. I have shown by way of example two such modifications in Figs. 7 and 8, though, of course, it is to be understood that my invention is not to be limited simply to these modifications. I may for example form a locking member 6 of an insulating member 24 to which are attached ears 110, 110 having heads 113, 113 provided with the reduced portions 111, 111 and the inclined surfaces 112, 112, in all respects similar to the corresponding surfaces in Fig. 5. This insulating lining 24 may be variously made. I have shown by way of example the insulating lining 24 as being built up of a plurality of fiber linings 25, 26. Mounted between the layers 25 and 26 are the shanks 27 of the ears 110, the shanks being preferably provided with teeth 28 to be pressed into the different fiber linings 25, 26 so as to be more firmly held but not to extend through them. It will be readily seen that by subjecting the linings 25, 26 and the interposed shanks 27 to suitable pressure in molds or otherwise that a unitary structure will be obtained and one to which the ears will be immovably connected. This insulating and locking lining is removably mounted in the cap 3 in the same manner as the removable locking insulating member 5 and serves to not only lock the cap and shell together, but also to insulate the cap and act as a strain relief in the same manner as the removable locking insulating member 5.

While I make my lining or locking member preferably of fiber, pressed paper, or some such material, I may in some cases, however, make it out of molded material such as porcelain. I have illustrated such a removable locking member in Fig. 8, the portion 29 of the member 7 being preferably porcelain or some similar insulating material which is molded around the shanks 30, 30 of the ears 210. To insure a firmer grip between the shanks and porcelain, I preferably, though not necessarily, provide the shanks with teeth 31, which, however, do not extend to either surface of the insulating member 29. The ears 210 are provided with heads 213, 213, each head having a reduced portion 211 and an inclined portion 212 which performs the same function as the similar surfaces in the removable locking insulating member 5, Fig. 5.

Instead of using a removable locking insulating member to directly lock the cap and shell together, I may in some instances employ an additional member to coöperate with the removable locking insulating member to lock the cap and shell together. In Figs. 9, 10, 11 and 12, I have shown such a device. In this form of my invention the removable locking insulating member 32, Fig. 11, is formed of an insulating disk 33 and a yoke 34. The yoke is formed in any suitable manner, preferably from a blank 35, Fig. 12, upon which is preferably formed integral tongues 36, 36. In bending the blank 35 into the form shown in Figs. 11 and 13, the tongues 36 are bent back upon the main body of the yoke so as to form seats upon which rests the insulating portion 33. These tongues are tapped to coöperate with locking screws 37, 37 which preferably extend longitudinally of the shell 38. The cap 39 is provided with an ordinary nipple 40 and preferably with an inturned flange 41 upon which removably rests the removable locking member 32. This member 32 which is also a combined removable locking insulating lining and strain relief is readily disengaged from the cap 39 by bending the yoke 34 so as to get it over the flange 41 of the cap to permit the casing to be replated or refinished. To connect the cap and shell together, it is merely necessary to bring them into their coöperating positions, Figs. 9 and 10, locating the tongues 36 over the ends of the locking screws 37. By then screwing the screws 37 within the tongues 36 the cap 39 and shell 38 will be locked together through the locking member 32 in an obvious manner.

Having thus described this invention in connection with several illustrative embodiments thereof to the details of which I do not desire to be limited, what is claimed as new and what it is desired to secure by Letters Patent is set forth in the appended claims:

1. In electric socket casings, the combination of a cap provided with a locking aperture to coöperate with and support a removable insulating lining in the cap, a shell provided with a locking aperture to register with the locking aperture in the cap, and a removable insulating lining provided with means to coöperate with the aperture in the cap to support the insulating lining in the cap, the same means being adapted to coöperate with the aperture in the shell to lock the cap and shell together.

2. In electric socket casings, the combination of a cap provided with a locking aperture to coöperate with and support a removable insulating lining in the cap, a shell provided with a locking aperture to register with the locking aperture in the cap, and a removable insulating lining provided with inclined means to coöperate with the aperture in the cap to support the insulating lining in the cap, the same inclined means being adapted to coöperate with the aperture in the shell to lock the cap and shell together.

3. In electric socket casings, the combination of a cap provided with one or more locking surfaces, a shell provided with one or more locking surfaces, and a removable insulating lining for the cap provided with permanently connected laterally extending means to coöperate with the locking surfaces in the cap and shell and to lock them together.

4. In electric socket casings, the combination of a cap provided with one or more openings, a shell provided with one or more angular slots provided with open throats, and a removable locking member removably mounted in the casing provided with lugs permanently connected to it to coöperate with the openings and slots in the cap and shell to lock them together.

5. In electric socket casings, the combination of a cap provided with one or more openings, a shell provided with one or more angular slots provided with open throats and a removable locking member removably mounted in the casing provided with a lug and a shorter inclined or wedge member to coöperate with the shell and with the openings and slots in the cap and shell to lock them together.

6. An article of manufacture for electric socket casings comprising an insulating lining for the cap provided with permanently connected means to engage a cap and shell to lock them together.

7. An article of manufacture for electric socket casings comprising a removable insulating lining for the cap provided with permanently connected locking lugs to lock a cap and shell together.

8. An article of manufacture for electric socket casings comprising a removable insulating lining for the cap provided with integral resilient ears having a reduced portion and an inclined portion.

9. In electric light socket casings, the combination of a cap and shell, a removable insulating lining for the cap, and fixed means carried by the insulating lining to engage the cap and shell to lock them together.

10. In electric socket casings, the combination of a shell provided with one or more slots having throats or reduced portions, a cap, a readily removable locking member mounted in the cap and provided with one or more ears having a reduced portion to pass through the throats or reduced portion of the slots in the shell and with inclined or wedge surfaces to coöperate with the shell.

11. In electric socket casings, the combination of a shell provided with a bayonet slot, a cap provided with an aperture, and a removable insulating lining for the cap provided with a resilient member, the latter having a member rigidly attached to it to coöperate with the aperture in the cap and the bayonet slot in the shell.

12. In electric socket casings, the combination of a shell provided with one or more slots having throats or reduced portions, a cap, a readily removable insulating lining mounted in the cap and provided with one or more ears having a reduced portion to pass through the throats or reduced portion of the slots on the shell and with inclined or wedge surfaces to coöperate with the shell.

13. In electric socket casings the combination of a shell with a bayonet slot, a cap, an insulating lining for, and detachably mounted within, the cap, said lining being provided with a projection permanently connected to it, said projection forming a stud member to coöperate with said bayonet slot and said projection also engaging the cap to prevent accidental relative rotation of the cap and shell.

JOSEPH KEEFE.

Witnesses:
JOHN H. PARKER,
RALPH A. SCHOENBERG.